UNITED STATES PATENT OFFICE.

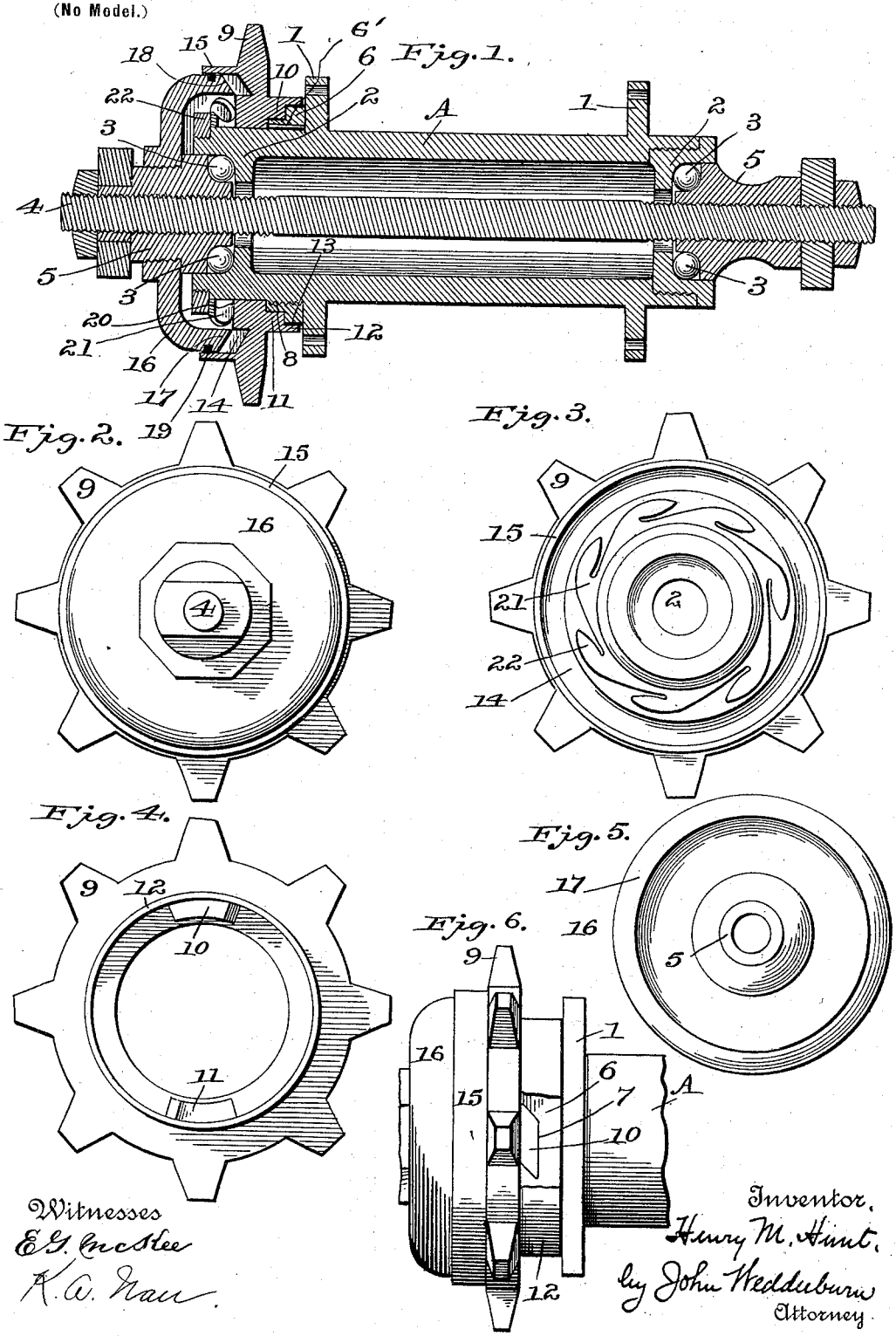

HENRY M. HUNT, OF INDIANAPOLIS, INDIANA.

BACK-PEDALING BRAKE.

SPECIFICATION forming part of Letters Patent No. 610,270, dated September 6, 1898.

Application filed June 19, 1896. Serial No. 596,143. (No model.)

*To all whom it may concern:*

Be it known that I, HENRY M. HUNT, a citizen of the United States, residing at Indianapolis, in the county of Marion and State of Indiana, have invented certain new and useful Improvements in Bicycle-Brakes; and I do hereby declare the following to be a full, clear, and exact description of the invention, such as will enable others skilled in the art to which it appertains to make and use the same.

My invention relates to automatic bicycle-brakes.

My object is to provide a simple, cheap, durable, and highly-efficient bicycle-brake which will be automatically thrown into action when the rider begins to "back-pedal," but which will be released as soon as the back-pedaling ceases.

Having this object in view my invention consists of an automatic bicycle-brake of novel and peculiar construction, as will appear more fully hereinafter.

In the accompanying drawings, Figure 1 is a longitudinal sectional view; Fig. 2, an end view of the hub of the rear wheel of a bicycle, showing my improvements applied thereon; Fig. 3, an end view with the friction-cone and outer ring removed; Fig. 4, an inner end view of the sprocket; Fig. 5, an inner end view of the friction-cone; and Fig. 6 a plan view of a hub equipped with my improvements, certain parts being broken away to better disclose the construction.

A designates the hub of the rear wheel of a bicycle, said hub being provided with the usual spoke-flanges 1. The usual ball-cups 2 are employed at opposite ends of the hub and receive the balls 3. The usual stationary spindle 4 extends through the hub and ball-cups, and on this spindle are located two adjustable bearing-cones 5, of the usual construction, and between which and the ball-cups the balls are held.

Screwed onto the hub is a clutch-collar 6, which rests against one of the spoke-flanges. This collar is keyed to the hub by a key 6 to prevent its turning. The outer face of this clutch-collar is provided with two diametrically opposite notches or recesses 7 and 8, which are of the shape of parallelograms. A sprocket 9 is loosely yet snugly received on the hub, and the inner face of this sprocket is provided with two clutches 10 and 11, which are of the same size and shape as the recesses 7 and 8 and project therein at all times except during back pedaling. An annular flange 12 projects from the inner face of the sprocket and receives the clutch-collar. An annular band 13, of felt, is interposed between the flange and the collar to exclude dust from entering. The outer face of the sprocket is provided with an annular groove 14, of triangular shape. A flange 15, of greater diameter than the aforesaid groove, projects out through the outer face of the sprocket.

The outer portion of cone 5, which is located at the end of the hub to which my improvements are applied, is suitably screw-threaded, as shown. My improved friction-cone 16 is received on the screw-threaded portion of the cone. This friction-cone is formed in the shape of a dish, and its inner edge is provided with a downwardly-inclined annular flange 17, which is adapted for reception in the annular groove or notch 14 of the sprocket. The rim or edge of this friction-cone is provided with an annular groove 18, which receives a felt washer 19, which abuts on the flange projecting from the outer face of the sprocket and excludes dust.

Numeral 20 designates an annular spring-washer, which is somewhat dished and is provided with a series of arms 21. This spring fits on the end of the hub and its arms rest against the outer face of the sprocket. A collar or ring 22, screwed on the extreme end of the hub, presses the spring against the sprocket, so that the clutches on the inner face of the latter are thrown normally into the recesses in the clutch-collar, so that the flange of the friction-cone is normally out of engagement with the sprocket.

The operation is as follows: When the bicycle is back-pedaled, the direction of rotation of the sprocket on the rear of the wheel is reversed and the clutches of said sprocket thrown out of the recesses in the clutch-collar against the action of the spring. The sprocket is now thrown into strong frictional contact with the friction-cone, so that great resistance is offered to the rotation of the drive-wheel, which results in a quick stoppage of the bicycle. As soon as the rider begins to pedal, as usual, the spring forces the sprocket inward on the hub and projects the clutch members into the pockets, so that the bicycle can be again propelled, as usual.

Having now described my invention, what I claim as new, and desire to secure by Letters Patent, is—

In an automatic bicycle-brake, the combination with a wheel-hub provided with a series of pockets, of a sprocket slidable in relation to the hub and having clutch members normally adapted for reception in the pockets, a spring-washer having a series of arms which abut on the sprocket and actuate the latter to keep its clutch members normally in the pockets of the hub, and a stationary dish-shaped friction-cone whose rim is normally out of contact with the sprocket, said members being so disposed and related that when the direction of rotation of the sprocket is reversed the clutch members of the latter will be thrown out of the pockets of the hub and the sprocket will be forced into frictional contact with the rim of the friction-cone.

In testimony whereof I have signed this specification in the presence of two subscribing witnesses.

HENRY M. HUNT.

Witnesses:
 CHAS. L. DE HAAS,
 RUFUS M. BARNES.